United States Patent
Choi et al.

(10) Patent No.: US 8,060,667 B2
(45) Date of Patent: Nov. 15, 2011

(54) APPARATUS AND METHOD FOR PROCESSING HIGH SPEED DATA USING HYBRID DMA

(75) Inventors: Jong-Mu Choi, Gunpo-si (KR); Jun-Yeop Jung, Suwon-si (KR); Jhong-II Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 233 days.

(21) Appl. No.: 12/477,575

(22) Filed: Jun. 3, 2009

(65) Prior Publication Data

US 2010/0005200 A1   Jan. 7, 2010

(30) Foreign Application Priority Data

Jul. 1, 2008   (KR) .................. 10-2008-0063350

(51) Int. Cl.
*G06F 3/00* (2006.01)
*G06F 13/00* (2006.01)

(52) U.S. Cl. ............... 710/22; 710/5; 710/33; 710/36; 710/47

(58) Field of Classification Search ............ None
See application file for complete search history.

(56) References Cited

U.S. PATENT DOCUMENTS

| 5,647,057 A | 7/1997 | Roden et al. |
| 5,822,618 A | 10/1998 | Ecclesine |
| 7,437,503 B2 | 10/2008 | Nalawadi et al. |
| 2003/0233506 A1 * | 12/2003 | Archambaud et al. ........ 710/260 |
| 2005/0108425 A1 * | 5/2005 | Rabinovitch .................. 709/238 |

FOREIGN PATENT DOCUMENTS

| EP | 0 903 670 A1 | 3/1999 |
| EP | 1 159 685 B1 | 8/2006 |
| JP | 56-166529 A | 12/1981 |
| KR | 10-2005-0057101 A | 6/2005 |

OTHER PUBLICATIONS

Computer and IO Architecture, Mar. 5, 2003, UCLA, [online, accessed on Mar. 14, 2011], URL: http://www.cs.ucla.edu/classes/spring03/cs111/I2/slides/computer.pdf.*

* cited by examiner

*Primary Examiner* — Tariq Hafiz
*Assistant Examiner* — Scott Sun
(74) *Attorney, Agent, or Firm* — Jefferson IP Law, LLP

(57) ABSTRACT

An apparatus and a method for processing high speed data using hybrid Direct Memory Access (DMA) are provided. The method includes determining a size of data to be transmitted, determining a memory access method of the data by comparing the determined size of the data with a first threshold, and determining an I/O bus access method of the data by comparing the determined size of the data with a second threshold.

17 Claims, 3 Drawing Sheets

# APPARATUS AND METHOD FOR PROCESSING HIGH SPEED DATA USING HYBRID DMA

PRIORITY

This application claims the benefit under 35 U.S.C. §119(a) of a Korean patent application filed in the Korean Intellectual Property Office on Jul. 1, 2008 and assigned Serial No. 10-2008-0063350, the entire disclosure of which is hereby incorporated by reference.

BACKGROUND OF THE INVENTION

1. Field of the Invention

The present invention relates to an apparatus and a method for processing high speed data using hybrid Direct Memory Access (DMA). More particularly, the present invention relates to an interface between a host processor and a peripheral Input/Output (I/O) unit for processing high speed data.

2. Description of the Related Art

DMA denotes a technique allowing a peripheral I/O unit to directly access a memory via a DMA controller without a host processor. DMA allows the peripheral I/O unit to operate even while the host processor performs an operation of a different process. Thus, DMA enhances data throughput and Central Processing Unit (CPU) use performance.

In a conventional art, as a method for accessing an I/O bus in order to transmit I/O data to a memory, only one of a DMA method, a non-DMA method, and a polling driving method or an interrupt driving method in case of the non-DMA method has been used. In the polling driving method and the interrupt driving method, a CPU provides a service to a peripheral I/O unit. In the interrupt driving method, a CPU provides a service only when a peripheral I/O unit requests the service. Therefore, the interrupt driving method is advantageous in the case where an amount of data to be transferred at one time via an I/O bus is large. On the other hand, in the polling driving method, a CPU monitors whether a peripheral I/O unit requires a service or whether the peripheral I/O unit is ready to receive a service using a predefined time interval. Therefore, the polling driving method is advantageous in the case where an amount of data to be transferred at one time via an I/O bus is small. That is, the polling driving method may provide better throughput in an aspect of data processing than the interrupt driving method, but has a poor tradeoff in the aspect of a bus occupancy rate.

A CPU sharing performance may be controlled depending on a selection of an I/O bus access method. When only one of the above methods for accessing an I/O bus is used, deterioration in a CPU use performance may result. For example, in the case where only the interrupt driving method is implemented, the interrupt driving method is also used in order to transfer small-sized data. In this case, since an additional overhead for interrupt processing is required despite small data, performance deterioration may result. On the other hand, in the case where only the polling driving method is implemented, during transmission of data having a size larger than a predefined size, other processors cannot share a resource because the resource is busy, and performance deterioration may result. Such limitations may be disadvantageous in an application where transmission of small-sized signaling data frequently occurs and high speed data transmission and excellent CPU use performance are required.

Therefore, a need exists for an apparatus and method for processing high speed data and improving a CPU use performance.

SUMMARY OF THE INVENTION

An aspect of the present invention is to address at least the above-mentioned problems and/or disadvantages and to provide at least the advantages described below. Accordingly, an aspect of the present invention is to provide an apparatus and a method for processing high speed data using hybrid DMA.

In accordance with an aspect of the present invention, a method for transmitting Input/Output (I/O) data of a memory in a data transmitting apparatus is provided. The method includes determining a size of data to be transmitted, determining a memory access method of the data by comparing the determined size of the data with a first threshold, and determining an I/O bus access method of the data by comparing the determined size of the data with a second threshold.

In accordance with another aspect of the present invention, an apparatus for transmitting I/O data of a memory is provided. The apparatus includes a transmission data size determining unit for determining a size of data to be transmitted, a memory access method determining unit for determining a memory access method of the data by comparing the determined size of the data with a first threshold, and an I/O bus access method determining unit for determining an I/O bus access method of the data by comparing the determined size of the data with a second threshold.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Exemplary embodiments of the present invention will be described herein below with reference to the accompanying drawings. In the following description, well-known functions or constructions are not described in detail since they would obscure the invention in unnecessary detail.

Exemplary embodiments of the present invention as described below illustrate an apparatus and a method for processing high speed data using hybrid Direct Memory Access (DMA).

Figure 1:
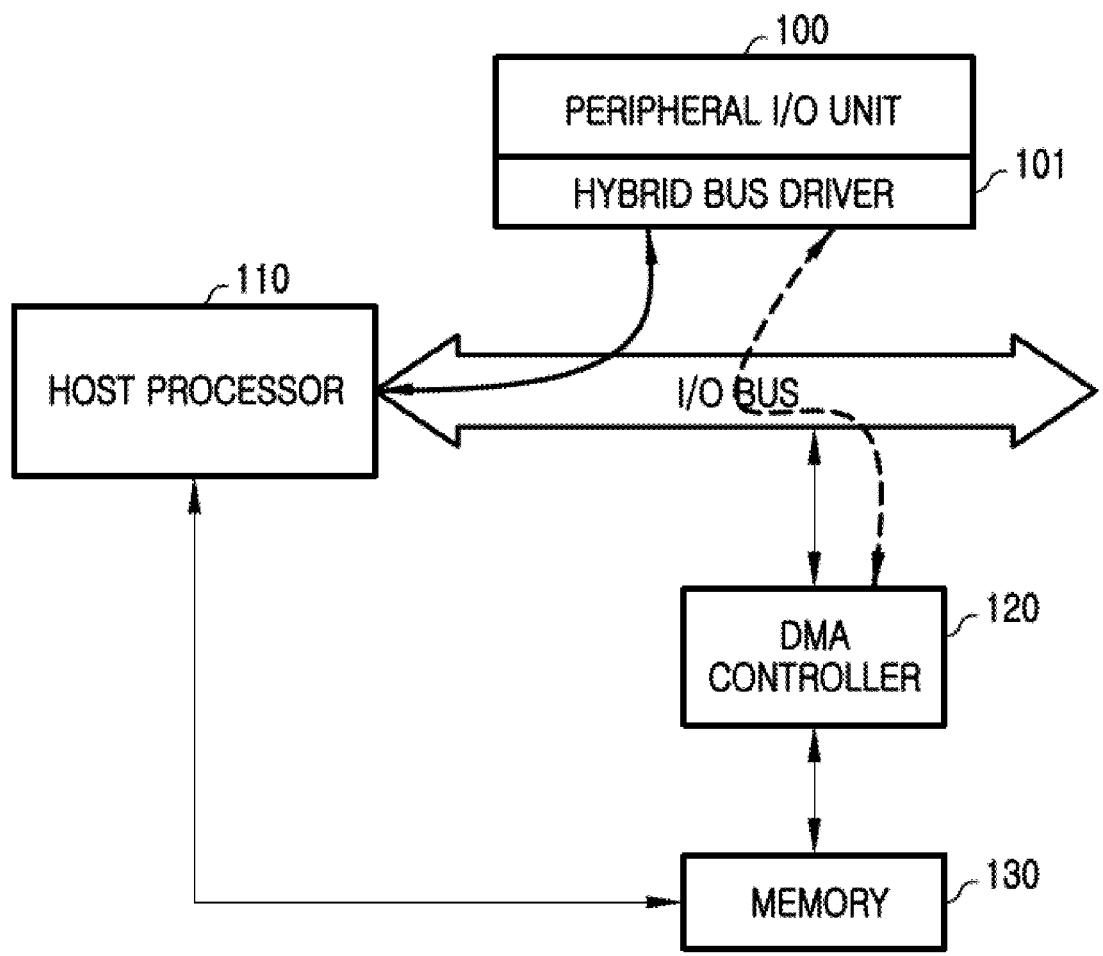
FIG. 1 is a view illustrating an apparatus for processing high speed data using hybrid DMA according to an exemplary embodiment of the present invention.

FIG. 1 is a view illustrating an apparatus for processing high speed data using hybrid DMA according to an exemplary embodiment of the present invention.

As illustrated in FIG. 1, the apparatus for processing the high speed data includes a peripheral Input/Output (I/O) unit 100, a host processor 110, a DMA controller 120 and a memory 130.

Referring to FIG. 1, the peripheral I/O unit 100 includes a hybrid bus driver 101. The peripheral I/O unit 100 determines a memory access method and an I/O bus access method depending on the size of transmission data using the hybrid bus driver 101, and transmits I/O data to the memory 130. Accordingly, two thresholds are defined for data transmission. The thresholds serve as reference values for selecting the memory access method and the I/O bus access method.

When a non-DMA method is determined as the memory access method and data are received from the peripheral I/O unit 100, the host processor 110 transmits the received data to the memory 130.

When a DMA method is determined as the memory access method and data are received from the peripheral I/O unit 100, the DMA controller 120 transmits the received data to the memory 130.

The memory 130 stores and manages data.

Figure 2:
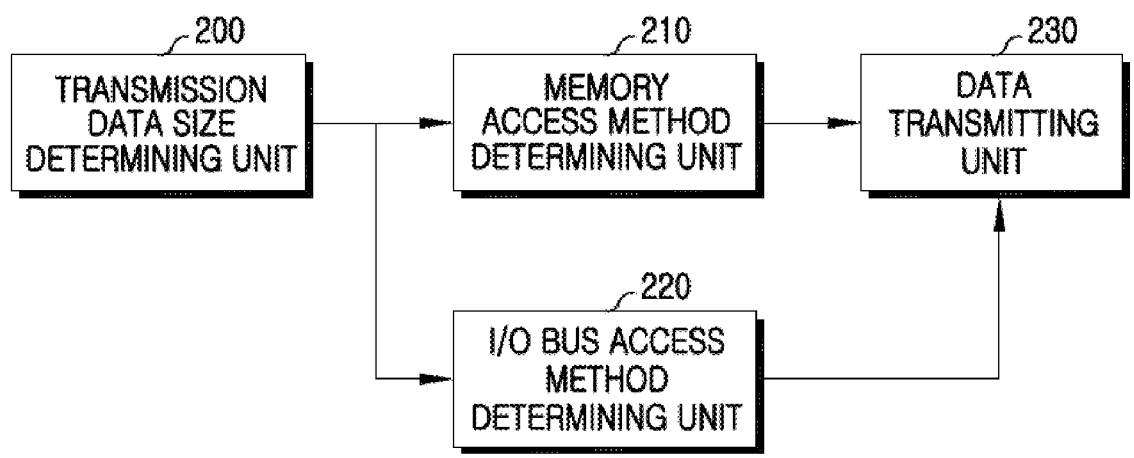
FIG. 2 is a block diagram illustrating a hybrid bus driver included in a peripheral I/O unit according to an exemplary embodiment of the present invention.

FIG. 2 is a block diagram illustrating a hybrid bus driver included in a peripheral I/O unit according to an exemplary embodiment of the present invention.

As illustrated in FIG. 2, the hybrid bus driver includes a transmission data size determining unit 200, a memory access method determining unit 210, an I/O bus access method determining unit 220 and a data transmitting unit 230.

Referring to FIG. 2, the transmission data size determining unit 200 determines and outputs the size of transmission data.

The memory access method determining unit 210 determines a memory access method of the transmission data by comparing the determination result from the transmission data size determining unit 200 with a first threshold, and outputs the determined memory access method. That is, when the size of the transmission data is greater than the first threshold, the DMA method is determined as the memory access method of the transmission data. When the size of the transmission data is less than or equal to the first threshold, a non-DMA method is determined and the non-DMA method is output as the memory access method of the transmission data. Here, the first threshold serves as a reference value used for determining whether the size of the transmission data is suitable for a DMA method-based transmission or a non-DMA method-based transmission. Generally, the first threshold is determined by measuring a time consumed for additional overhead for using an interrupt driving method of the DMA, and an overhead time of an interrupt driving method of the non-DMA. Therefore, the first threshold may be a data size corresponding to an overhead process time of the interrupt driving method of the DMA, but may change variously depending on settings, such as a memory access time, a bus clock and the like.

The I/O bus access method determining unit 220 determines an I/O bus access method of the transmission data by comparing the determination result from the transmission data size determining unit 200 with the second threshold, and outputs the determined I/O bus access method. That is, when the size of the transmission data is greater than the second threshold, the I/O bus access method determining unit 220 determines the interrupt driving method as the I/O bus access method of the transmission data. When the size of the transmission data is less than or equal to the second threshold, the I/O bus access method determining unit 220 determines and outputs a polling driving method as the I/O bus access method of the transmission data. Here, the second threshold serves as a reference value used for determining whether the size of the transmission data is suitable for an interrupt driving method-based transmission, or a polling driving method-based transmission. Generally, the second threshold is determined by measuring a time consumed for additional overhead for using the interrupt driving method, and a time consumed for data transmission of the polling driving method which does not use an interruption. Therefore, the second threshold may be a data size corresponding to an overhead process time by the interrupt driving method, but may change variously depending on settings, such as a memory access time, a bus clock and the like.

The data transmitting unit 230 transmits the transmission data using the memory access method determined by the memory access method determining unit 210 and the I/O bus access method determined by the I/O bus access method determining unit 220.

Here, the first threshold is greater than the second threshold. In the case where the polling driving method is used for transmission of large data, a busy waiting is applied for a long time and a Central Processing Unit (CPU) sharing performance may be deteriorated. Therefore, the DMA method transmits data using only the interrupt driving method.

Figure 3:
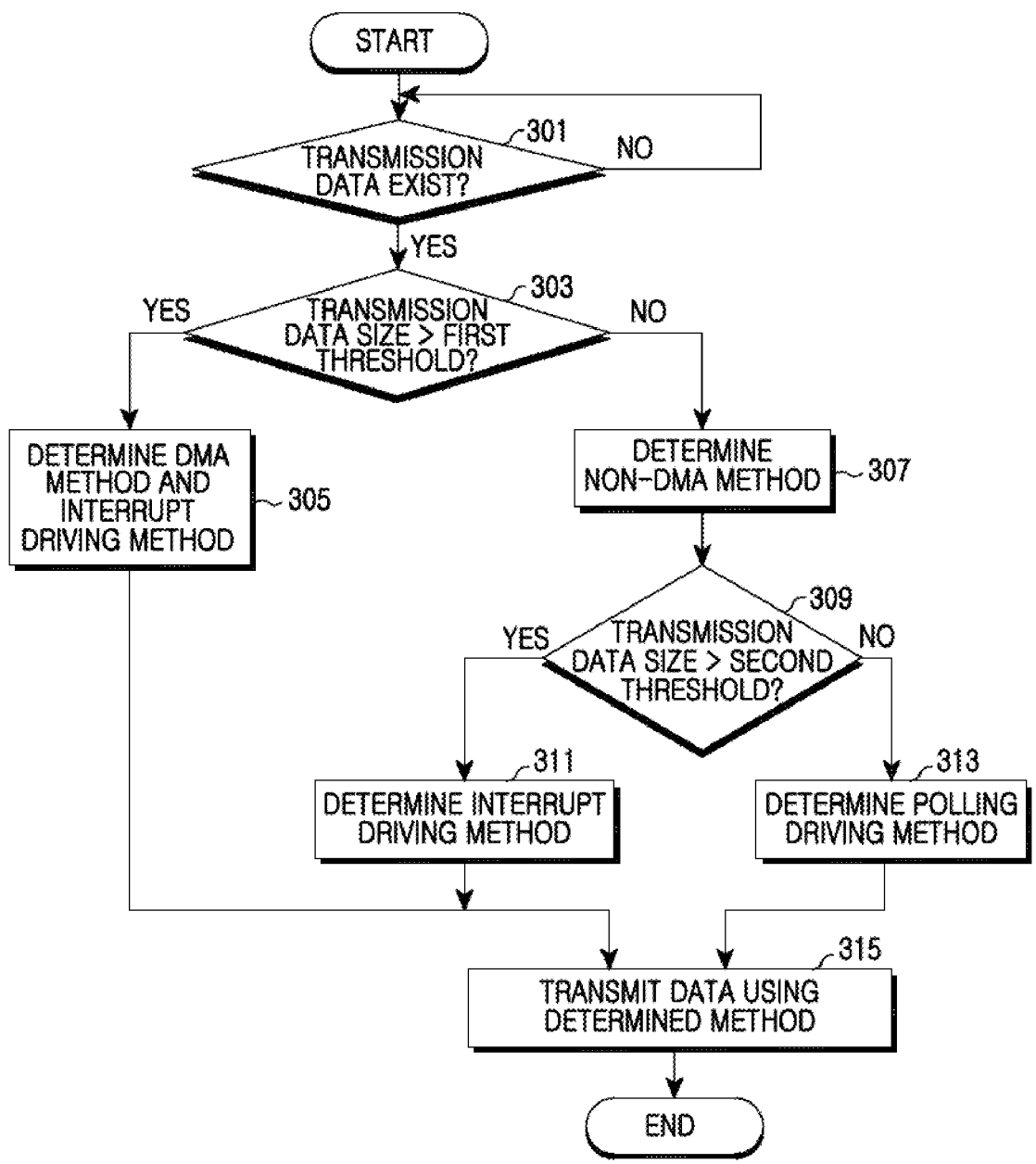
FIG. 3 is a flowchart illustrating a method for processing high speed data of a hybrid bus driver included in a peripheral I/O unit according to an exemplary embodiment of the present invention.

FIG. 3 is a flowchart illustrating a method for processing high speed data of a hybrid bus driver included in a peripheral I/O unit according to an exemplary embodiment of the present invention.

Referring to FIG. 3, in step 301, the hybrid bus driver determines whether transmission data exists. When the transmission data does not exist, the hybrid bus driver returns to step 301 and repeatedly determines whether transmission data exists. On the other hand, when the transmission data exists, the hybrid bus driver determines whether the size of the transmission data is greater than the first threshold in step 303.

When the size of the transmission data is greater than the first threshold in step 303, the hybrid bus driver determines the DMA method as the memory access method of the transmission data, and determines the interrupt driving method as the I/O bus access method of the transmission data in step 305. In step 315, the hybrid bus driver transmits the data using the determined DMA method and the interrupt driving method.

In contrast, when the size of the transmission data is less than or equal to the first threshold in step 303, the hybrid bus driver determines the non-DMA method as the memory access method in step 307, and determines whether the size of the transmission data is greater than the second threshold in step 309. When the size of the transmission data is greater than the second threshold in step 309, the hybrid bus driver determines the interrupt driving method as the I/O bus access method in step 311. The hybrid bus driver then transmits the data using the determined non-DMA method and interrupt driving method in step 315. On the other hand, when the size of the transmission data is less than or equal to the second threshold, the hybrid bus driver determines the polling driving method as the I/O bus access method in step 313, and transmits the data using the determined non-DMA method and polling driving method in step 315.

The hybrid bus driver then ends the processing of the high speed data.

The exemplary embodiments of the present invention have an advantage of improving data throughput and CPU use performance by providing an apparatus and a method for processing high speed data using hybrid DMA. Also, the exemplary embodiments of the present invention provide a simultaneous application driving environment and high speed data transmission.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting Input/Output (I/O) data of a memory in a data transmitting apparatus, the method comprising:
   determining a size of data to be transmitted;
   determining a memory access method of the data by comparing the determined size of the data with a first threshold; and
   based on a result of the determining of the memory access method, determining an I/O bus access method of the data by comparing the determined size of the data with a second threshold,
   wherein the determining of the I/O bus access method comprises:
      when the determined size of the data is greater than the second threshold, determining an interrupt driving method as the I/O bus access method of the data;
      when the determined size of the data is less than or equal to the second threshold, determining a polling driving method as the I/O bus access method of the data.

2. The method of claim 1, wherein the first threshold is greater than the second threshold.

3. The method of claim 1, wherein the determining of the memory access method comprises:
   when the determined size of the data is greater than the first threshold, determining a Direct Memory Access (DMA) method as the memory access method of the data; and
   when the determined size of the data is less than or equal to the first threshold, determining a non-DMA method as the memory access method of the data.

4. The method of claim 3, wherein the first threshold is determined by measuring a time consumed for additional overhead for using the interrupt driving method of the DMA and an overhead time of the interrupt driving method of the non-DMA.

5. The method of claim 1, wherein the second threshold is determined by measuring a time consumed for additional overhead for using the interrupt driving method and a time consumed for data transmission of the polling driving method.

6. The method of claim 1, further comprising transmitting the data using the determined memory access method and I/O bus access method.

7. An apparatus for transmitting Input/Output (I/O) data of a memory, the apparatus comprising:
   a transmission data size determining unit for determining a size of data to be transmitted;
   a memory access method determining unit for determining a memory access method of the data by comparing the determined size of the data with a first threshold; and
   an I/O bus access method determining unit for determining an I/O bus access method of the data by comparing the determined size of the data with a second threshold based on a result of the determining of the memory access method,
   wherein the I/O bus access method determining unit comprises:
      a unit for determining an interrupt driving method as the I/O bus access method of the data, when the determined size of the data is greater than the second threshold; and
      a unit for determining a polling driving method as the I/O bus access method of the data, when the determined size of the data is less than or equal to the second threshold.

8. The apparatus of claim 7, wherein the first threshold is greater than the second threshold.

9. The apparatus of claim 7, wherein the memory access method determining unit comprises:
   a unit for determining a Direct Memory Access (DMA) method as the memory access method of the data, when the determined size of the data is greater than the first threshold; and
   a unit for determining a non-DMA method as the memory access method of the data, when the determined size of the data is less than or equal to the first threshold.

10. The apparatus of claim 9, wherein the first threshold is determined by measuring a time consumed for additional overhead for using the interrupt driving method of the DMA and an overhead time of the interrupt driving method of the non-DMA.

11. The apparatus of claim 7, wherein the second threshold is determined by measuring a time consumed for additional overhead for using the interrupt driving method and a time consumed for data transmission of the polling driving method.

12. The apparatus of claim 7, further comprising a data transmitting unit for transmitting the data using the determined memory access method and I/O bus access method.

13. A method for transmitting Input/Output (I/O) data of a memory in a data transmitting apparatus, the method comprising:

determining a size of data to be transmitted;

determining a Direct Memory Access (DMA) method as a memory access method of the data and an interrupt driving method as an I/O bus access method of the data, when the determined size of the data is greater than a first threshold;

determining a non-DMA method as the memory access method of the data, when the determined size of the data is less than or equal to the first threshold; and when the non-DMA method is determined as the memory access method of the data, determining the interrupt driving method as the I/O bus access method of the data, when the determined size of the data is greater than a second threshold; and determining a polling driving method as the I/O bus access method of the data, when the determined size of the data is less than or equal to the second threshold.

14. The method of claim 13, wherein the first threshold is greater than the second threshold.

15. The method of claim 13, wherein the first threshold is determined by measuring a time consumed for additional overhead for using the interrupt driving method of the DMA and an overhead time of the interrupt driving method of the non-DMA.

16. The method of claim 13, wherein the second threshold is determined by measuring a time consumed for additional overhead for using the interrupt driving method and a time consumed for data transmission of the polling driving method.

17. The method of claim 13, further comprising transmitting the data using the determined memory access method and I/O bus access method.

* * * * *